(12) United States Patent
Jones et al.

(10) Patent No.: US 12,398,608 B2
(45) Date of Patent: Aug. 26, 2025

(54) WELLBORE EXCLUSION FLUID METHOD AND APPARATUS FOR DOWNHOLE LOGGING

(71) Applicant: Halliburton Energy Services, Inc., Houston, TX (US)

(72) Inventors: Christopher Michael Jones, Katy, TX (US); Xiang Wu, Singapore (SG); Jichun Sun, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 120 days.

(21) Appl. No.: 17/957,231

(22) Filed: Sep. 30, 2022

(65) Prior Publication Data
US 2024/0110452 A1 Apr. 4, 2024

(51) Int. Cl.
| | | |
|---|---|---|
| *E21B 23/04* | (2006.01) | |
| *E21B 23/06* | (2006.01) | |
| *E21B 33/12* | (2006.01) | |
| *F16J 15/43* | (2006.01) | |
| *G01V 11/00* | (2006.01) | |
| *E21B 47/00* | (2012.01) | |

(52) U.S. Cl.
CPC .......... *E21B 23/0415* (2020.05); *E21B 23/06* (2013.01); *E21B 33/1208* (2013.01); *F16J 15/43* (2013.01); *G01V 11/002* (2013.01); *E21B 47/00* (2013.01)

(58) Field of Classification Search
CPC .... G01V 11/002; F16J 15/43; E21B 23/0415; E21B 23/06; E21B 33/108; E21B 47/00
See application file for complete search history.

(56) References Cited

U.S. PATENT DOCUMENTS

| | | | |
|---|---|---|---|
| 5,215,313 A | 6/1993 | Yokouchi et al. | |
| 6,817,415 B2 * | 11/2004 | Orban | E21B 33/12 |
| | | | 166/66.5 |
| 10,502,017 B2 * | 12/2019 | Marya | E21B 33/134 |
| 11,242,725 B2 * | 2/2022 | Fripp | E21B 23/06 |
| 2010/0024540 A1 | 2/2010 | Vasques et al. | |
| 2016/0040507 A1 | 2/2016 | Donderici et al. | |
| 2017/0191341 A1 | 7/2017 | Fripp et al. | |

FOREIGN PATENT DOCUMENTS

WO 2015102568 7/2015

OTHER PUBLICATIONS

"PCT Application No. PCT/US2022/077479, International Search Report and Written Opinion", Jun. 27, 2023, 12 pages.

* cited by examiner

*Primary Examiner* — Jill E Culler
(74) *Attorney, Agent, or Firm* — DeLizio, Peacock, Lewin & Guerra LLP (57) ABSTRACT

In some embodiments, a downhole logging tool configured for placement in a wellbore comprises a first magnet configured to activate a first volume of ferromagnetic fluid disposed between the downhole logging tool and the wellbore to achieve a first seal between a primary analysis region of the downhole logging tool and a wellbore fluid.

20 Claims, 5 Drawing Sheets

WELLBORE EXCLUSION FLUID METHOD AND APPARATUS FOR DOWNHOLE LOGGING

TECHNICAL FIELD

The disclosure generally relates to wellbores formed in subsurface formations, and in particular, logging tools used to evaluate subsurface formations.

BACKGROUND

In various well logging applications (such as acoustic logging, electromagnetic logging, laser inspection of casings, nuclear magnetic resonance logging. etc.), a logging tool may be disposed in a wellbore to evaluate a subsurface formation. Some fluids around the logging tool may contribute to lower signal-to-noise ratios (SNRs) or systematic signal deviations than others. Therefore, a primary analysis region of the logging tool comprising a benign logging fluid may benefit from isolation from a wellbore fluid to improve received signals. While traditional packers may be optimized to maintain static isolation in the subsurface environment, they may fail to maintain isolation when subject to longitudinal movement. Sometimes, isolation of the primary analysis region from the wellbore fluid is desirable for applications in which the logging tool is subject to active motion.

BRIEF DESCRIPTION OF THE DRAWINGS

Embodiments of the disclosure may be better understood by referencing the accompanying drawings.

DESCRIPTION OF EMBODIMENTS

Overview

Various wellbore fluids (e.g., drilling mud) may present difficulties for downhole logging. Solid particles and high viscosities in various drilling muds may degrade and complicate signals related to downhole logging operations. Some implementations of the inventive subject matter may form seals that segregate these muds (or other wellbore fluids) from components that perform subsurface/downhole logging. A downhole logging tool may include a magnet that may activate a ferromagnetic fluid to form one or more seals between itself and a wellbore which may be a cased hole or an open hole. The seals may reside above and/or below and/or within a primary analysis region (e.g., the region including logging components) of the logging tool, or the seals may surround the primary analysis region. Because the primary analysis region may be sealed-off from the wellbore fluid, the primary region may include a logging fluid (e.g., salt water) that enables higher accuracy in logging.

The description that follows includes example systems, methods, techniques, and program flows that embody embodiments of the disclosure. However, it is understood that this disclosure may be practiced without these specific details. For instance, this disclosure refers to downhole logging using a logging tool comprising at least one magnet, at least one volume of a ferromagnetic fluid isolator, a benign logging fluid, and isolating a primary analysis region of the logging tool from wellbore fluids during active logging operations in which the logging tool is subject to motion. Example embodiments may also be applied to formation evaluation using an acoustic logging tool, an electromagnetic (EM) logging tool, a nuclear magnetic resonance (NMR) logging tool, nuclear logging tools, optical logging tools, or casing evaluation/cleaning operations. In other instances, well-known instruction instances, protocols, structures, and techniques have not been shown in detail in order not to obfuscate the description.

Example Logging Tool Configuration

Figure 1:
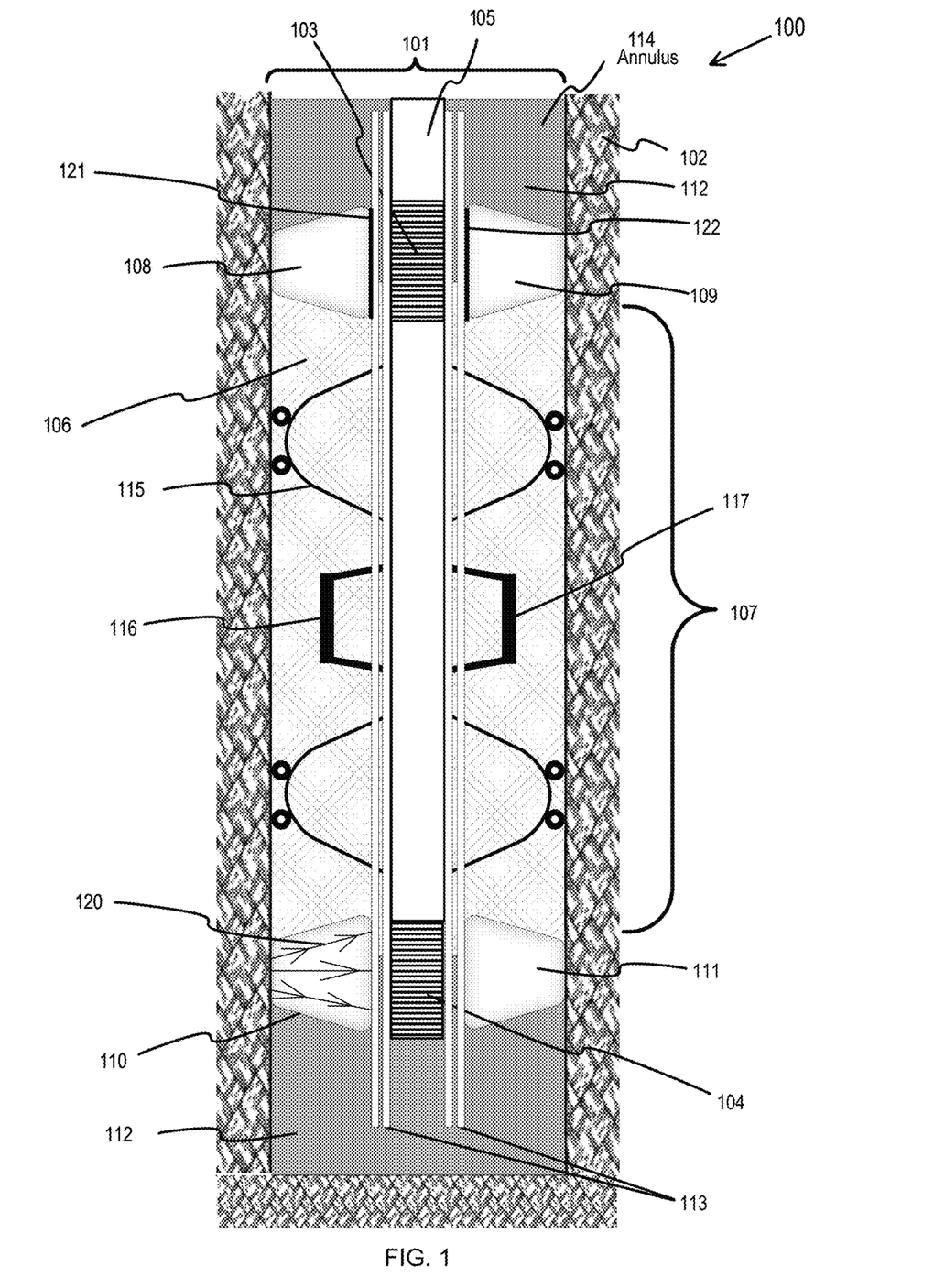
FIG. 1 depicts a cross-sectional view of a wellbore comprising an exemplary logging tool having magnets and ferromagnetic fluid isolators, according to some embodiments.

Some embodiments may be used in downhole applications to isolate a primary analysis region of a logging tool to increase the SNR of received signals during a subsurface logging operation or if the wellbore fluid interferes, obstructs, or deviates the signals of a logging tool in any way. For example, some embodiments may be used in measurement-while-drilling (MWD), logging-while-drilling (LWD) and wireline operations, which are further described below. The technique may also be applicable to coiled tubing operations, slick line operations or any other conveyance method for logging operations. An example application for subsurface logging using ferromagnetic fluid isolators is now described, although other types of logging operations are possible with the described configuration. In particular, FIG. 1 depicts an example logging tool configuration as part of a subsurface logging operation in which magnets and ferromagnetic fluid isolators may be used to isolate a primary analysis region of the logging tool comprising logging components (transmitter/receiver components, pads to contact the formation, etc.) from the wellbore fluid, according to some embodiments. A logging tool configuration 100 may be suited to address issues posed by well logging operations in which a downhole logging tool comprising a logging environment including a benign logging fluid is subject to motion.

FIG. 1 depicts a cross-sectional view of a wellbore comprising an exemplary logging tool having magnets and ferromagnetic fluid isolators, according to some embodiments. In FIG. 1, a logging tool 105 is deployed within a well that is defined by a wellbore 101 drilled into a subsurface formation 102. The wellbore 101 may be cased down to a suitable depth. The logging tool 105 may be generally configured to transmit pulses of energy into the subsurface formation 102 and record responses and process the responses to determine properties of multiple material layers within the wellbore 101 or of the subsurface formation 102. For example, the logging tool 105 may be equipped with acoustic transmitters and receivers for acoustic logging operations. However, the logging tool 105 may be configured for other operations such as EM logging, NMR logging, other logging operations involving nuclear tools, optical borehole logging operations via laser inspection, through-tubing cement evaluation, etc. The transmitter/receiver components may be located within a primary analysis region 107 of the logging tool, which may be an annular space comprising a logging fluid 106 and may be sealed off from a wellbore fluid 112 by ferromagnetic fluid isolators 108-111. The ferromagnetic fluid isolators 108-111, while labeled as four distinct components for ease of understanding the cross section, may exist in the three-dimensional space as top and bottom isolation layers of the primary analysis region 107. The transmitter/receiver components may be housed within respective housings on the logging tool 105, or the transmitter/receiver components may be disposed on extendable pads 116-117. The extendable pads may be flush with the logging tool 105 when the logging tool is being conveyed to a target zone or depth interval and may extend via extendable arms towards the subsurface formation 102 when logging operations commence. For additional stability, the logging tool 105 may comprise a plurality of centralizers 115 comprising wheels and/or skids to maintain centralization of the logging tool as the tool moves up or down the wellbore during logging. In some embodiments, the centralizers 115 may contact the subsurface formation 102. As the logging tool 105 is conveyed through the wellbore to a target logging depth, the ferromagnetic fluid isolators 108-111 may be activated by a magnetic field generated by magnets 103-104 disposed near opposing ends of the logging tool 105. The ferromagnetic fluid isolators 108-111 may follow the magnets 103-104 as the logging tool 105 is moved through the wellbore 101 to the target depth. Similarly, the ferromagnetic fluid isolators 108-111 may move with the magnets 103-104 when actively logging.

Logging tools such as logging tool 105 may be sensitive to fluid variations in the wellbore, where desired formation data or received signals may be diminished by the wellbore fluid. Certain fluids in the wellbore fluid, such as drilling muds, may make logging operations (e.g., acoustic logging, EM logging, etc.) difficult, as the various solid particles within the muds may degrade and complicate signals. Thus, sealing/isolating the primary analysis region 107 of the logging tool from the wellbore fluid may increase the SNR of logging operations and enhance data validity. To achieve this isolation, the logging tool 105 may utilize the magnets 103-104 and ferromagnetic fluid isolators 108-111. The magnets 103-104 may consist of permanent magnets such as neodymium magnets or comprise magnetic material of similar strength and may be included on the logging tool 105 at or near top and bottom boundaries of the primary analysis region 107. The magnets may be electromagnets which may help shape or move the ferromagnetic fluid dynamically as desired. The ferromagnetic fluid isolators 108-111 may be disposed in an annulus 114 between a bypass 113 of the logging tool 105 and the subsurface formation 102 (or optionally a casing in cased-hole applications). In some embodiments, the logging tool 105 may comprise an internal bypass, and the ferromagnetic fluid isolators 108-111 may be disposed between the logging tool 105 and the subsurface formation 102.

The ferromagnetic fluid isolators 108-111 each may include a volume of ferromagnetic fluid that may be activated by the magnets 103-104. The ferromagnetic fluid isolators 108-111 may be deployed into the wellbore 101 at the surface. The ferromagnetic fluid isolators 108-111 may be comprised of either an oil, aqueous, or fluorocarbon ferrofluid base insoluble in water and/or oil as needed. The ferromagnetic fluid isolators 108-111 may be designed to preferably have a high viscosity, for instance, greater than 2,000 cp or 7,000 cp and may include a large percentage of magnetic particulates to retain structural integrity under differential pressure. A viscous base oil may help prevent mixing with contact fluids. The volumes disposed in the wellbore may be substantial enough to fill the annulus 114 with a layer of ferromagnetic fluid, thereby forming the seal which separates the primary analysis region 107 from the wellbore fluid 112.

A logging fluid 106 may reside within the primary analysis region 107 formed between the ferromagnetic fluid isolators 108-111. The logging fluid 106 may be selected to be benign to logging equipment, i.e., the logging fluid may not negatively impact the SNR of received signals, alter signals, or negatively impact signals for analysis in any other way to the degree the wellbore fluid would. For example, the logging fluid 106 may comprise salt water or mineral oil. Selection of a singular, known logging fluid to saturate the primary analysis region 107 also may enable a greater degree of freedom in hardware requirements, as calibrations for various types of drilling muds within the wellbore fluid may not be required with the consistent environment created in the primary analysis region. Furthermore, because the magnets 103-104 (and accompanying ferromagnetic fluid isolators) may be part of the logging tool 105 and not included on a separate component of a bottomhole assembly (BHA) or logging system by other conveyance, there may not be a need for packers or additional isolation equipment.

The logging fluid 106 may be deployed via a flow path to the primary analysis region 107 at the surface. In some embodiments, the logging tool 105 may additionally comprise a fluid reservoir and check valve system within the logging tool 105 and proximate to the primary analysis region 107 to store the logging fluid until a target logging depth is reached. The logging fluid may then be deployed from the fluid reservoir and into the primary analysis region 107 between the ferromagnetic fluid isolators 108-111. If the logging fluid becomes contaminated, the logging fluid 106 may be flushed from the primary analysis region 107 to the wellbore fluid 112 within annulus 114, and a check valve within the logging tool may prevent backflow contamination from occurring. New, uncontaminated logging fluid may additional be pumped into the primary analysis region 107. The logging fluid 106 is contained within the primary analysis region 107 by the ferromagnetic fluid isolators 108-111 throughout the logging operation and during active movement of the logging tool 105 through the wellbore 101.

In some embodiments, a bypass 113 may be installed either within the logging tool 105 or external to the logging tool (as seen in FIG. 1) to allow the wellbore fluid 112 to navigate around the primary analysis region 107 without inducing contamination of the logging fluid 106. The external bypass 113, as depicted in FIG. 1 may exist as a singular pipe or a plurality of pipes between the logging tool 105 and the ferromagnetic fluid isolators 108-111 which permit passage of the wellbore fluid around the logging fluid 106 and primary analysis region 107. In some embodiments, an internal bypass may also comprise a singular pipe or plurality of pipes to convey the wellbore fluid 112 without inducing contamination of the logging fluid 106.

In some embodiments, the logging tool 105 may include additional sets of ferromagnetic fluid isolators above and/or below and/or within the primary ferromagnetic fluid isolators 108-111 to provide additional sealing capability. The additional ferromagnetic fluid isolators may create multiple seals for enhanced isolation of the primary analysis region from potential contaminants.

In some embodiments, the logging tool 105 may include sensors 121-122 disposed on the logging tool body adjacent to the ferromagnetic fluid isolators 108-111. The sensors 121-122 may include, but are not limited to electromagnetic sensors, acoustic sensors, electric sensors, or magnetic sensors. While not depicted, the sensors 121-122 may be similarly adjacent to ferromagnetic fluid isolators 110-111. The sensors 121-122 may be configured to determine an azimuthal or lateral thickness of each of the ferromagnetic fluid isolators 108-111 at one or more locations within the wellbore. The thickness of the ferromagnetic fluid isolators 108-111, as determined by the sensors 121-122, may be used to determine a position of the logging tool 105 in the wellbore, an angle of the logging tool 105, or a volume of the wellbore at a given location. The sensors 121-122 may provide information for logging data correction. Alternatively, ferromagnetic fluid isolator thickness and/or shape data may be measurements of primary interest.

In some embodiments, the logging tool 105 may further include a plurality of shaping devices 120, such as brushes. The shaping devices 120 may comprise bristles, appendages, or other suitable structures of varying gauge or material and provide internal structure or external isolation to the ferromagnetic fluid isolators 108-111. The shaping devices 120 may provide a three-dimensional structure by which the ferromagnetic fluid isolators 108-111 may retain increased structural integrity. The enhanced structural integrity of the isolators may assist in maintaining their sealing capability. In some embodiments, the shaping devices 120 consist of a non-rigid, deformable material. In some embodiments, the shaping devices 120 may be formed from metallic or magnetic material. Alternate embodiments may utilize materials analogous to sponge, stainless-steel wool, or copper wool in place as the shaping devices 120. In some embodiments, the logging tool 105 may comprise additional shaping devices above ferromagnetic fluid isolators 108-109 and below ferromagnetic fluid isolators 110-111 which are not enveloped in ferromagnetic fluid. Rather, the additional shaping devices are used to clean the wellbore of debris, primarily for cased-hole logging use, although the shaping devices may provide some advantages in open-hole logging use, especially for clearing loose cuttings from the wellbore.

Figure 2:
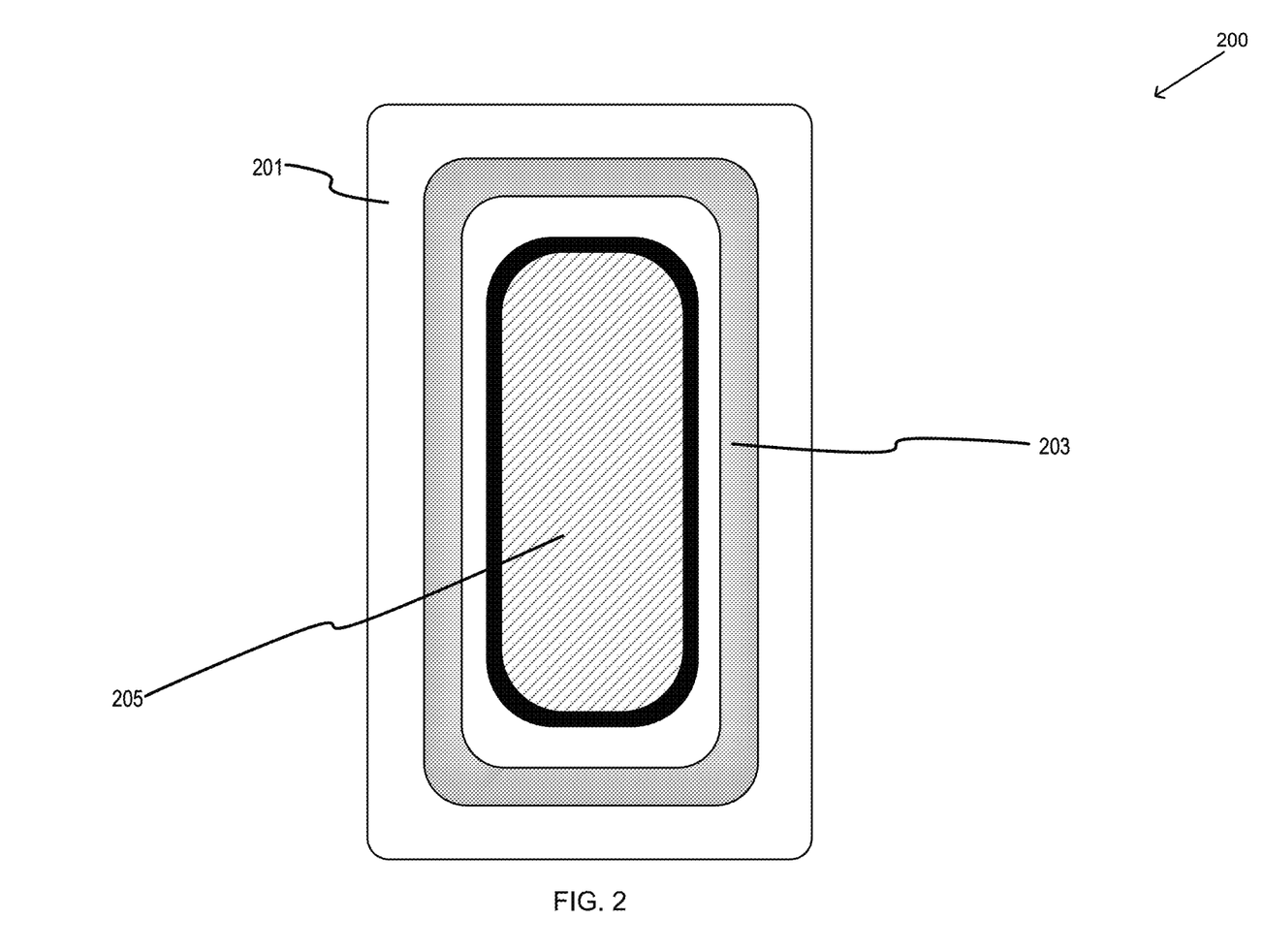
FIG. 2 depicts an example magnetic pad comprising a ferromagnetic fluid isolator to isolate logging tool components from contaminants, according to some embodiments

FIG. 2 depicts an example magnetic pad comprising a ferromagnetic fluid isolator to isolate logging tool components from contaminants, according to some embodiments.

Example Magnetic Pad Configuration

The logging tool 105 may comprise one at least one extendable magnetic pad. The magnetic pad may expand for logging and retract when not in use. With reference to FIG. 2, a magnetic pad 200 includes a magnetic backing 201 near the rear of the pad, a ferromagnetic fluid isolator 203, and a pad face 205. The magnetic backing 201 may comprise a magnetic material similar to the magnets 103-104 of FIG. 1. The magnetic backing 201 may activate the ferromagnetic fluid isolator 203 which may form a sealing ring around the pad face 205. The ferromagnetic fluid isolator 203 may also make contact with the subsurface formation 102 of FIG. 1 when the magnetic pad 200 is extended. The ferromagnetic fluid isolator 203 may be similar to the ferromagnetic fluid isolators 108-111 of FIG. 1. The ferromagnetic fluid isolator 203 may seal the pad face 205 between itself and the subsurface formation 102.

The magnetic pad 200 may travel longitudinally with the logging tool 105. The ferromagnetic fluid isolator 203 may allow the pad face 205 to log the subsurface formation 102 (or casing) while the logging tool 105 is moving. This may solve an issue of traditional logging tool and pad configurations which comprise rubber/polymer seals and may experience difficulty conducting mobile logging operations in which a pad used for logging may require a seal against the formation. In some embodiments, the logging tool 105 is equipped with a rotatable portion that may rotate the magnetic pad 200 (or multiple pads) around the wellbore as the logging tool 105 moves longitudinally through the wellbore 101. Similar to the extendable pads 116-117 of FIG. 1, the magnetic pad 200 may be configured to extend or retract from the logging tool 105 via extendable arms. In some embodiments, a computer may be configured to initiate the extension of the magnetic pad 200. Alternatively, the position of the magnetic pad 200 may be adjusted manually via hardware components (e.g., hydraulic lines).

Example Logging Operation

Figure 3:
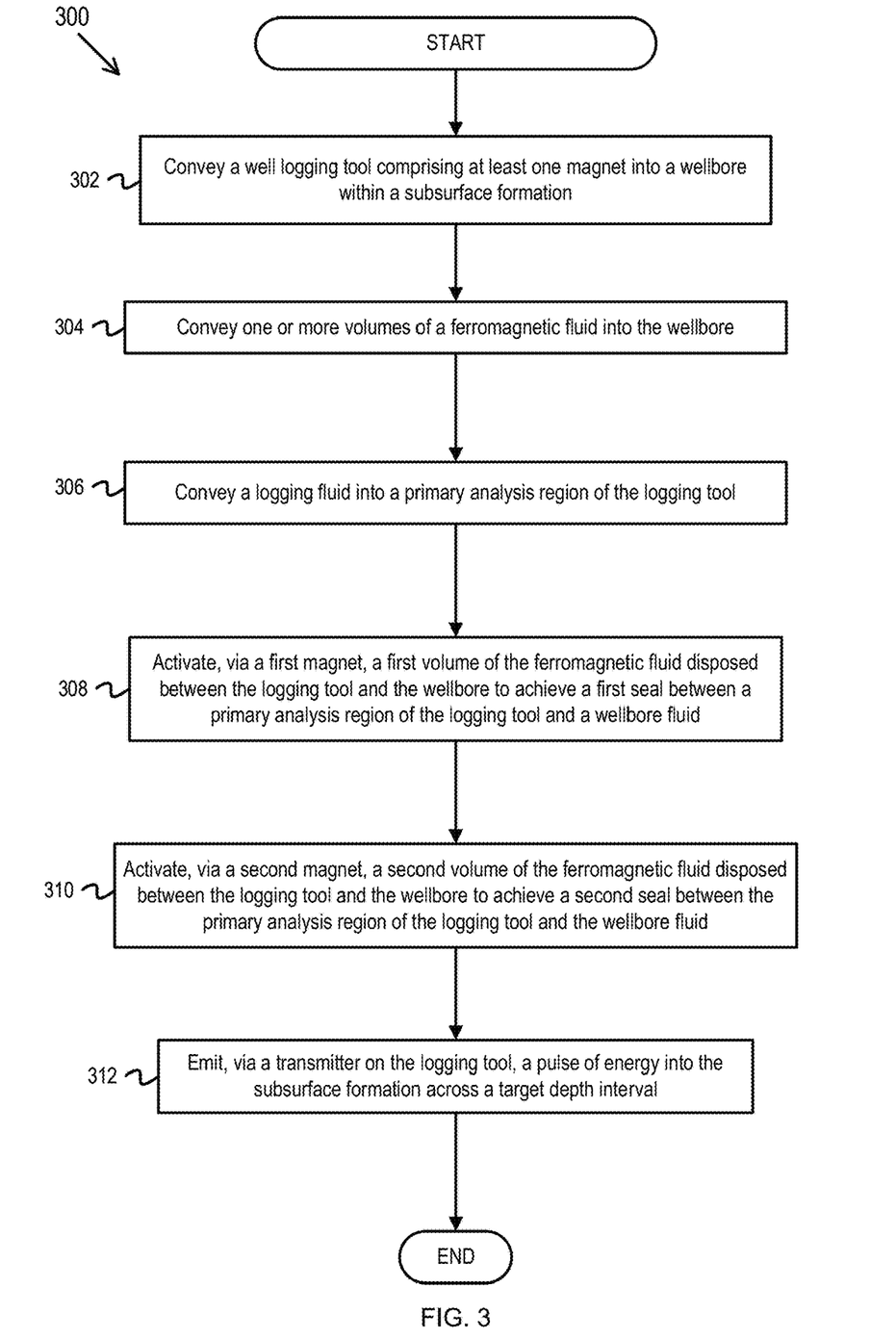
FIG. 3 depicts a flowchart of example operations for isolated downhole logging with ferromagnetic fluid, according to some embodiments

Example operation of the exemplary logging tool configuration is now described. FIG. 3 depicts a flowchart of example operations for isolated logging with ferromagnetic fluid, according to some embodiments. Operations of a flowchart 300 may be performed by software, firmware, hardware, or a combination thereof. Such operations are described with reference to the systems of FIGS. 1-2. However, such operations may be performed by other systems or components. For example, some of the operations may be performed by a computer within the exemplary logging tool or at the surface. The operations of the flowchart 300 start at block 302.

At block 302, a well logging tool comprising at least one magnet is conveyed into a wellbore within a subsurface formation. For example, with reference to FIG. 1, the logging tool 105 is lowered down the wellbore 101 to conduct logging operations of the subsurface formation 102. The logging tool 105 may comprise at least one of magnets 103-104. In some embodiments, the logging tool may include acoustic logging equipment, nuclear logging equipment, optical logging equipment, etc.

At block 304, one or more volumes of a ferromagnetic fluid are conveyed into the wellbore. For example, with reference to FIG. 1, the ferromagnetic fluid isolators 108-111 may be conveyed into an annulus 114 surrounding the logging tool 105 within the wellbore 101. A first volume of ferromagnetic fluid may be placed into the wellbore proximate to a lower magnet on the logging tool as it enters the wellbore. For example, with reference to FIG. 1, ferromagnetic fluid isolators 110-111 may be placed into the wellbore 101 proximate to the magnet 104. Similarly, ferromagnetic fluid isolators 108-109 may be loaded into the wellbore 101 proximate to the magnet 103. The ferromagnetic fluid volumes may travel alongside the magnets as the logging tool travels through the wellbore.

At block 306, a logging fluid is conveyed into a primary analysis region of the logging tool. For example, with reference to FIG. 1, the logging fluid 106 is conveyed into the primary analysis region 107. This operation may either take place at the surface, or the logging fluid 106 may be released into the primary analysis region 107 at depth via a fluid reservoir and valve system.

At block 308, a first volume of the ferromagnetic fluid disposed between the logging tool and the wellbore is activated via a first magnet to achieve a first seal between a primary analysis region of the logging tool and a wellbore fluid. For example, with reference to FIG. 1, the ferromagnetic fluid isolators 108-109 may be activated by the magnet 103 to achieve a first seal between the primary analysis region 107 and the wellbore fluid 112. Similarly, the ferromagnetic fluid isolators 110-111 may be activated by the magnet 104 to achieve a first seal between the primary analysis region 107 and the wellbore fluid 112. The volume of ferromagnetic fluid may span the annulus between the logging tool and the subsurface formation and isolates the logging fluid of the primary analysis region from the wellbore fluid.

At block 310, a second volume of the ferromagnetic fluid disposed between the logging tool and the wellbore is activated via a second magnet to achieve a second seal between the primary analysis region of the logging tool and a wellbore fluid. For example, with reference to FIG. 1, the ferromagnetic fluid isolators 110-111 may be activated by the magnet 104 (the same is true for the other magnet-isolators pair) to achieve the second seal between the primary analysis region 107 and the wellbore fluid 112.

Figure 5:
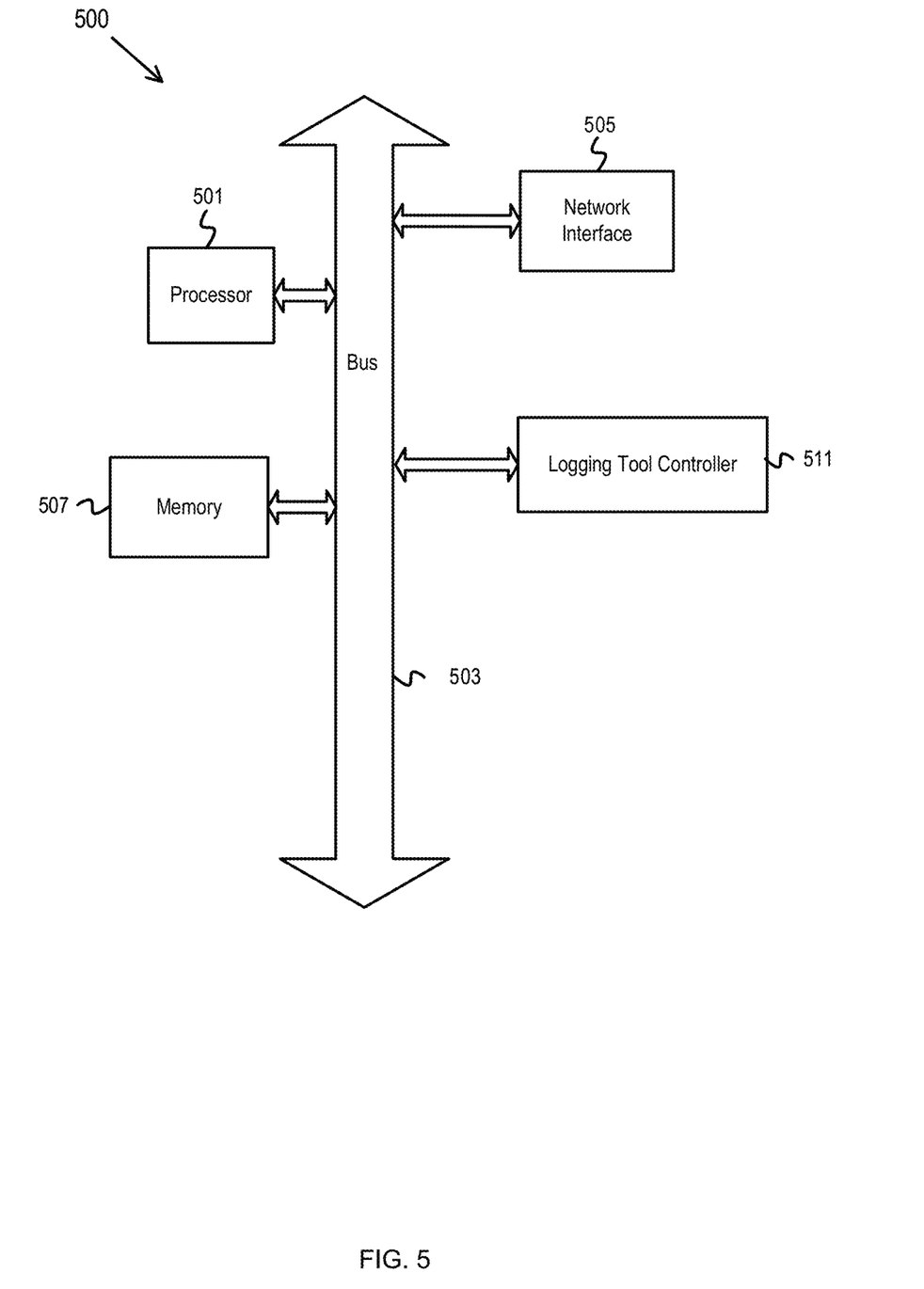
FIG. 5 depicts an example computer, according to some embodiments.

At block 312, a pulse of energy is emitted from a transmitter of the logging tool into the subsurface wellbore to the one or more casing sections, one or more cement sections, the open hole, the formation, or a combination therein across a target depth interval. For example, with reference to FIG. 1, extendable pads 116-117 may extend from the logging tool 105 to contact the subsurface formation 102 as the logging tool 105 moves across a target depth interval. The extendable pads 116-117 may comprise transmitters to emit the pulse of energy into the formation. For example, with reference to FIG. 2, the pad face 205 may comprise the transmitter component which is additionally isolated from the wellbore fluid by the ferromagnetic fluid isolator 203. With reference to FIG. 5, a computer 500 may comprise a processor 501 to emit pulses of energy into the subsurface formation and a logging tool controller 511 to process received signals by receiver components on the logging tool.

In some embodiments, the transmitter component may be located on the body of the logging tool itself. The transmitter and/or other logging components within the primary analysis region may similarly be isolated from the wellbore fluid by the activated volumes of ferromagnetic fluid. In some embodiments, the transmitter may be replaced with a receiver component for operations that purely require signal detection rather than signal emission (e.g, detecting leaks). Should the logging operation require additional isolation of the primary analysis region, multiple sets of ferromagnetic fluid isolators and magnet pairs may be utilized.

Other Example Applications

Figures 4A, 4B:
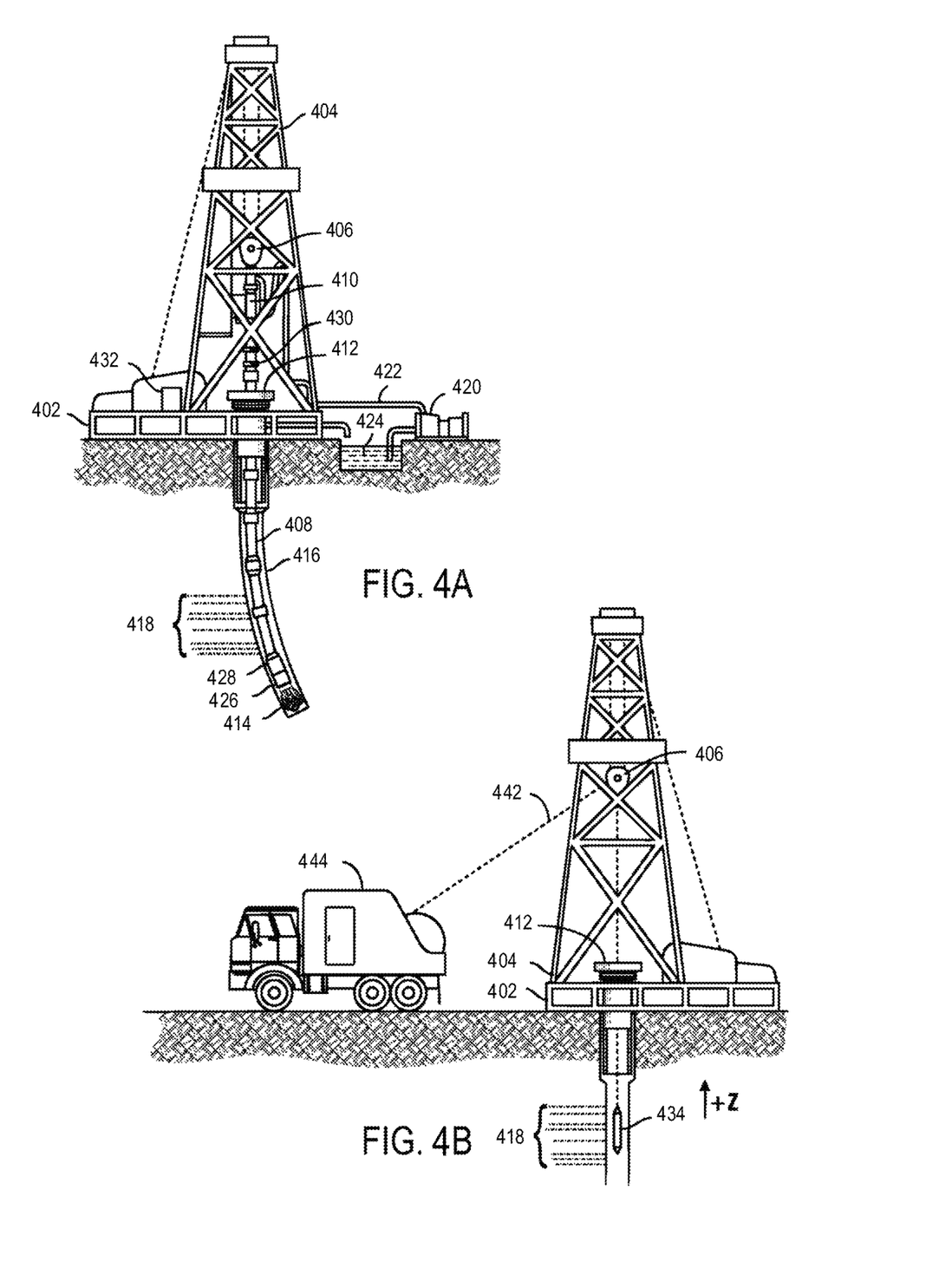
FIG. 4A depicts an example logging while drilling (LWD) system, according to some embodiments.
FIG. 4B depicts an example wireline system, according to some embodiments.

Embodiments of the logging tool and ferromagnetic fluid isolators may be used in various forms of logging operations, as described in FIGS. 4A-4B. FIG. 4A depicts an example logging while drilling (LWD) system, according to some embodiments. A drilling platform 402 supports a derrick 404 having a traveling block 406 for raising and lowering a drill string 408. A kelly 410 supports the drill string 408 as it is lowered through a rotary table 412. A drill bit 414 is driven by a downhole motor and/or rotation of the drill string 408. As the drill bit 414 rotates, it creates a wellbore 416 that passes through various formations 418. A pump 420 circulates drilling fluid through a feed pipe 422 to the kelly 410, downhole through the interior of the drill string 408, through orifices in the drill bit 414, back to the surface via the annulus around the drill string 408, and into a retention pit 424. The drilling fluid transports cuttings from the borehole into the retention pit 424 and aids in maintaining the borehole integrity.

A downhole logging tool 426 may be integrated into the bottom-hole assembly near the drill bit 414. The downhole logging tool 426 may take the form of a drill collar (i.e., a thick-walled tubular that provides weight and rigidity to aid the drilling process). The downhole logging tool 426 may also include one or more navigational packages for determining the position, inclination angle, horizontal angle, and rotational angle of the tool. Such navigational packages may include, for example, accelerometers, magnetometers, and/or sensors. The ferromagnetic fluid isolators 108-111 of FIG. 1 may also be used as positional sensors to aid in the logging process by detecting a thickness of the ferromagnetic fluid at one or more locations laterally or azimuthally by means such as, but not limited to acoustic thickness detection, electromagnetic thickness detection, magnetic detection, electric detection, volume detection, lateral extent detection or combination therein as ferromagnetic fluid shape detection. The ferromagnetic fluid shape detection may be used to determine the position of the downhole logging tool 426, angle of the downhole logging tool 426, or a volume of the wellbore 416 at a given location. Such information not only may provide information for logging corrections, but the information may also comprise measurements of primary interest.

For purposes of communication, a downhole telemetry sub 428 may be included in the bottom-hole assembly to transfer measurement data to a surface receiver 430 and to receive commands from the surface. Mud pulse telemetry is one common telemetry technique for transferring tool measurements to surface receivers and receiving commands from the surface, but other telemetry techniques may also be used. In some embodiments, the downhole telemetry sub 428 may store logging data for later retrieval at the surface when the logging assembly is recovered.

At the surface, the surface receiver 430 may receive the uplink signal from the downhole telemetry sub 428 and may communicate the signal to a data acquisition module 432. The data acquisition module 432 may include one or more processors, storage mediums, input devices, output devices, software, etc. The data acquisition module 432 may collect, store, and/or process the data received from the downhole logging tool 426 to process signal responses which may aid in determining formation properties or wellbore characteristics. For example, the data collected by the data acquisition module 432 may be used to evaluate a formation porosity, formation anisotropy, cement integrity, and identify gas-comprising zones, among other uses.

At various times during the drilling process, the drill string 408 may be removed from the borehole as shown in FIG. 4B. In particular, FIG. 4B depicts an example wireline system, according to some embodiments.

Once the drill string has been removed, logging operations may be conducted using a wireline logging tool 434 (i.e., a sensing instrument sonde suspended by a cable 442 having conductors for transporting power to the tool and telemetry from the tool to the surface). The wireline logging tool 434 may have pads and/or centralizing springs to maintain the tool near the central axis of the borehole or to bias the tool towards the borehole wall as the tool is moved downhole or uphole. The wireline logging tool 434 may also include one or more navigational packages for determining the position, inclination angle, horizontal angle, and rotational angle of the tool. Such navigational packages may include, for example, accelerometers, magnetometers, and/or sensors. In some embodiments, a surface measurement system (not shown) may be used to determine the depth of the wireline logging tool 434.

As explained further below, the wireline logging tool 434 may include a logging instrument that collects signal responses from a transmitter or transmitters on the wireline logging tool that reveal information about properties of the formations 418 and the wellbore 416. A logging facility 444 may include a computer, such as those described further in FIG. 5, for collecting, storing, and/or processing the measurements gathered by the wireline logging tool 434 (e.g., to determine characteristics such as porosity, anisotropy, gas-comprising zones within the formations 418, and/or cement bonding integrity of the casing).

Although FIGS. 4A and 4B depict specific borehole configurations, it should be understood by those skilled in the art that the present disclosure is equally well suited for use in wellbores having other orientations including vertical wellbores, horizontal wellbores, slanted wellbores, multilateral wellbores, and the like. Also, even though FIGS. 4A and 4B depict an onshore operation, it should be understood by those skilled in the art that the present disclosure is equally well suited for use in offshore operations. Moreover, it should be understood by those skilled in the art that the present disclosure is not limited to the environments depicted in FIGS. 4A and 4B, and may also be used, for example, in other well operations such as non-conductive production tubing operations, jointed tubing operations, coiled tubing operations, combinations thereof, and the like.

Example Computer

Embodiments of the exemplary logging tool having ferromagnetic fluid isolators may be used in conjunction with an example computer, as described in FIG. 5. A computer 500 system includes a processor 501 (possibly including multiple processors, multiple cores, multiple nodes, and/or implementing multi-threading, etc.). The computer 500 includes a memory 507. The memory 507 may be system memory or any one or more of the above already described possible realizations of machine-readable media. The computer 500 also includes a bus 503 and a network interface 505. The computer 500 may communicate via transmissions to and/or from remote devices via the network interface 505 in accordance with a network protocol corresponding to the type of network interface, whether wired or wireless and depending upon the carrying medium. In addition, a communication or transmission may involve other layers of a communication protocol and or communication protocol suites (e.g., transmission control protocol, Internet Protocol, user datagram protocol, virtual private network protocols, etc.).

The computer 500 also includes a logging tool controller 511. The logging tool controller 511 may perform one or more of the operations described herein. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for well logging as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Embodiments

Embodiment #1: A downhole logging tool configured for placement in a wellbore, comprising: a first magnet configured to activate a first volume of ferromagnetic fluid disposed between the downhole logging tool and the wellbore to achieve a first seal between a primary analysis region of the downhole logging tool and a wellbore fluid.

Embodiment #2: The downhole logging tool of Embodiment 1 further including: shaping devices configured to be submerged in the ferromagnetic fluid and to provide structure to the ferromagnetic fluid.

Embodiment #3: The downhole logging tool of Embodiment 2, wherein the shaping devices include brushes configured to clear debris from the wellbore or a casing in the wellbore.

Embodiment #4: The downhole logging tool of any one of Embodiments 1-3 further comprising: a second magnet configured to activate a second volume of ferromagnetic fluid disposed between the downhole logging tool and the wellbore to achieve a second seal between the primary analysis region of the downhole logging tool and the wellbore fluid.

Embodiment #5: The downhole logging tool of Embodiment 4, wherein the first seal is above the primary analysis region and the second seal is below the primary analysis region, wherein the first and second seals isolate the primary analysis region from the wellbore fluid, and wherein the primary analysis region includes a logging fluid.

Embodiment #6: The downhole logging tool of any one of Embodiments 1-5 wherein the first seal is configured to remain operable during movement of the downhole logging tool.

Embodiment #7: The downhole logging tool of any one of Embodiments 1-6 further comprising: a sealing pad including a third magnet configured to activate a third volume of ferromagnetic fluid to achieve a third seal between the sealing pad and the wellbore.

Embodiment #8: The downhole logging tool of Embodiment 7, wherein the third seal between the sealing pad and the wellbore is configured to be operable during movement of the sealing pad.

Embodiment #9: The downhole logging tool of any one of Embodiments 1-8, wherein the ferromagnetic fluid has an oil base, aqueous base, or a fluorocarbon base.

Embodiment #10: The downhole logging tool of any one of Embodiments 1-9, wherein a plurality of sensors is used to detect a thickness of the ferromagnetic fluid, wherein the thickness of the ferromagnetic fluid is used to determine a position of the downhole logging tool, an angle of the downhole logging tool, or a wellbore volume at a given location.

Embodiment #11: A method comprising: conveying a downhole logging tool into a wellbore; and activating, via a first magnet, a first volume of ferromagnetic fluid disposed between the downhole logging tool and the wellbore to achieve a first seal between a primary analysis region of the downhole logging tool and a wellbore fluid.

Embodiment #12: The method of Embodiment 11 further comprising: moving the downhole logging tool while the first volume of ferromagnetic fluid is activated, wherein the first seal between the primary analysis region of the downhole logging tool and the wellbore is maintained during the movement.

Embodiment #13: The method of any one of Embodiments 11-12 further comprising: activating, via a second magnet, a second volume of ferromagnetic fluid to achieve a second seal between a sealing pad of the downhole logging tool and the wellbore.

Embodiment #14: The method of Embodiment 13 further comprising: moving the sealing pad while the second volume of ferromagnetic fluid is activated, wherein the second seal between the sealing pad and the wellbore is maintained during the movement.

Embodiment #15: The method of any one of Embodiments 11-14, wherein the downhole logging tool includes a plurality of shaping devices configured to provide shape to the first volume of ferromagnetic fluid when the first volume of ferromagnetic fluid is activated.

Embodiment #16: A system comprising: a first volume of ferromagnetic fluid; and a downhole logging tool configured for placement in a wellbore including, a first magnet configured to activate the first volume of ferromagnetic fluid disposed between the downhole logging tool and the wellbore to achieve a first seal between a primary analysis region of the downhole logging tool and a wellbore fluid.

Embodiment #17: The system of Embodiment 16, wherein the downhole logging tool further includes: shaping devices configured to be submerged in the first volume of ferromagnetic fluid and to provide structure to the first volume of ferromagnetic fluid.

Embodiment #18: The system of Embodiment 17, wherein the shaping devices include brushes configured to clear debris from the wellbore or a casing in the wellbore.

Embodiment #19: The system of any one of Embodiments 16-18, wherein the downhole logging tool further comprises: a second magnet configured to activate a second volume of ferromagnetic fluid disposed between the downhole logging tool and the wellbore to achieve a second seal between the primary analysis region of the downhole logging tool and the wellbore fluid.

Embodiment #20: The system of Embodiment 19, wherein the first seal is above the primary analysis region and the second seal is below the primary analysis region, and wherein the first and second seals isolate the primary analysis region from the wellbore fluid.

What is claimed is:

1. A downhole logging tool configured for placement in a wellbore, the downhole logging tool comprising:
   at least a first magnet configured to activate a first volume of ferromagnetic fluid disposed between the downhole logging tool and the wellbore to achieve a first seal between a primary analysis region of the wellbore and a wellbore fluid, and wherein the first volume of ferromagnetic fluid forms at least a first boundary of the primary analysis region; and
   a first device positioned on the downhole logging tool and within the primary analysis region of the wellbore, wherein the primary analysis region includes a logging fluid different from the ferromagnetic fluid.

2. The downhole logging tool of claim 1 further including:
   one or more shaping devices configured to be submerged in the ferromagnetic fluid and to provide structure to the ferromagnetic fluid.

3. The downhole logging tool of claim 2, wherein the one or more shaping devices include brushes configured to clear debris from the wellbore or a casing in the wellbore.

4. The downhole logging tool of claim 1 further comprising:
   a second magnet configured to activate a second volume of ferromagnetic fluid disposed between the downhole logging tool and the wellbore to achieve a second seal between the primary analysis region of the wellbore and the wellbore fluid.

5. The downhole logging tool of claim 4, wherein the first seal is above the primary analysis region and the second seal is below the primary analysis region, wherein the first and second seals isolate the primary analysis region from the wellbore fluid.

6. The downhole logging tool of claim 1 wherein the first seal is configured to remain operable during movement of the downhole logging tool.

7. The downhole logging tool of claim 1, wherein the first device comprises a sealing pad, wherein the sealing pad includes a third magnet configured to activate a third volume of ferromagnetic fluid to achieve a third seal between the sealing pad and the wellbore.

8. The downhole logging tool of claim 7, wherein the third seal between the sealing pad and the wellbore is configured to be operable during movement of the sealing pad.

9. The downhole logging tool of claim 1, wherein the ferromagnetic fluid has an oil base, aqueous base, or a fluorocarbon base.

10. The downhole logging tool of claim 1, wherein one or more sensors are configured to detect a thickness of the ferromagnetic fluid, and wherein the thickness of the ferromagnetic fluid is used to determine a position of the downhole logging tool, an angle of the downhole logging tool, or a wellbore volume at a given location.

11. A method comprising:
   conveying a downhole logging tool into a wellbore, wherein the downhole logging tool is configured to obtain measurements from a primary analysis region of the wellbore including a logging fluid; and
   activating, via a first magnet, a first volume of ferromagnetic fluid disposed between the downhole logging tool and the wellbore to achieve a first seal between the primary analysis region of the wellbore and a wellbore fluid, wherein the first volume of ferromagnetic fluid forms at least a first boundary of the primary analysis region, and wherein the logging fluid is different from the ferromagnetic fluid.

12. The method of claim 11 further comprising:
   moving the downhole logging tool while the first volume of ferromagnetic fluid is activated, wherein the first seal between the primary analysis region of the wellbore and the wellbore fluid is maintained during the movement of the downhole logging tool.

13. The method of claim 11 further comprising:
activating, via a second magnet, a second volume of ferromagnetic fluid to achieve a second seal between a sealing pad of the downhole logging tool and the wellbore.

14. The method of claim 13 further comprising:
moving the sealing pad while the second volume of ferromagnetic fluid is activated, wherein the second seal between the sealing pad and the wellbore is maintained during the movement of the sealing pad.

15. The method of claim 11, wherein the downhole logging tool includes one or more shaping devices configured to provide shape to the first volume of ferromagnetic fluid when the first volume of ferromagnetic fluid is activated.

16. A system comprising:
a first volume of ferromagnetic fluid; and
a downhole logging tool configured for placement in a wellbore, wherein the downhole logging tool is configured to obtain measurements from a primary analysis region of the wellbore including a logging fluid different from the ferromagnetic fluid, and wherein the downhole logging tool includes,
a first magnet configured to activate the first volume of ferromagnetic fluid disposed between the downhole logging tool and the wellbore to achieve a first seal between the primary analysis region of the wellbore and a wellbore fluid, wherein the first volume of ferromagnetic fluid forms at least a first boundary of the primary analysis region.

17. The system of claim 16, wherein the downhole logging tool further includes:
one or more shaping devices configured to be submerged in the first volume of ferromagnetic fluid and to provide structure to the first volume of ferromagnetic fluid.

18. The system of claim 17, wherein the one or more shaping devices include brushes configured to clear debris from the wellbore or a casing in the wellbore.

19. The system of claim 16, wherein the downhole logging tool further comprises:
a second magnet configured to activate a second volume of ferromagnetic fluid disposed between the downhole logging tool and the wellbore to achieve a second seal between the primary analysis region of the wellbore and the wellbore fluid.

20. The system of claim 19, wherein the first seal is above the primary analysis region and the second seal is below the primary analysis region, and wherein the first and second seals isolate the primary analysis region from the wellbore fluid.

* * * * *